(12) United States Patent
Ding

(10) Patent No.: US 7,664,887 B2
(45) Date of Patent: Feb. 16, 2010

(54) DEVICE ARCHITECTURE TO SUPPORT MULTIPLE PROTOCOLS

(75) Inventor: Yi Ding, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 92 days.

(21) Appl. No.: 11/600,528

(22) Filed: Nov. 15, 2006

(65) Prior Publication Data

US 2008/0115147 A1 May 15, 2008

(51) Int. Cl.
G06F 3/00 (2006.01)
G06F 13/12 (2006.01)
(52) U.S. Cl. .................................. 710/8; 710/11; 710/62
(58) Field of Classification Search ....................... 710/8, 710/11, 62
See application file for complete search history.

(56) References Cited

U.S. PATENT DOCUMENTS

| | | | | |
|---|---|---|---|---|
| 6,032,203 | A * | 2/2000 | Heidhues | 710/11 |
| 7,093,244 | B2 * | 8/2006 | Lajoie et al. | 717/168 |
| 7,316,022 | B2 * | 1/2008 | Nishio | 719/321 |
| 2004/0015952 | A1 * | 1/2004 | Lajoie et al. | 717/171 |

OTHER PUBLICATIONS

William Stallings, Operating Systems Internals and Design Principles (Class Slides), 2000, Prentice Hall, 4th edition, Chapter 9.*
Beatty, J., "Web Services Dynamic Discovery (WS-Discovery)," Apr. 2005, retrieved on the internet at http://schemas.xmlsoap.org/ws/2005/04/discovery/ws-discovery.xsd, retrieved on Feb. 26, 2007, 1 page.
Alexander, Jan, et al., "Web Service Transfer (WS-Transfer)," 2004 BA Systems, Inc.—Computer Associates—Microsoft Corporation, Inc.-Sonic Software—Systinet Corporation, 17 pages.
Christensen, Erik et al., "Web Services Description Language (WSDL) 1.1—W3C Note Mar. 2001," Copyright 2001, Ariba—IBM Corporation—Microsoft, retrieved from the internet at http://www.w3.org/TR/2001/NOTE-wsdl-20010315, retrieved on Mar. 12, 2007, 45 pages.

* cited by examiner

*Primary Examiner*—Alford W Kindred
*Assistant Examiner*—David E Martinez
(74) *Attorney, Agent, or Firm*—Hickman Palermo Truong & Becker LLP

(57) ABSTRACT

A method and apparatus for adding support, to a device, for a new protocol which the device did not previously support is provided. Protocol information, which identifies how to add support for the protocol to the device, is stored. A protocol manager may read the protocol information and perform actions necessary for the new protocol to be supported by the device. For example, the protocol manager may create a listener, a message queue, and a protocol handler for the protocol based on the protocol information. The listener may receive a message, associated with the new protocol, that was sent to the device and store the message in a message queue. The message queue stores the message until the message is retrieved from the message queue by the protocol handler. The protocol handler, after retrieving a message from the message queue, may process the message.

18 Claims, 5 Drawing Sheets

DEVICE ARCHITECTURE TO SUPPORT MULTIPLE PROTOCOLS

FIELD OF THE INVENTION

The present invention generally relates to an architecture, for a device, that supports multiple protocols.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Electronic devices typically support a variety of protocols. A protocol supported by a device may be directed towards any type of activity involving the device. For example, the way in which a device communicates with another entity may be dictated, at least in part, upon a protocol.

Typically, a device is manufactured to support a fixed set of protocols. If, after the device is manufactured, it is desired that the device support a new protocol, then the device must be refurbished. For example, for a device to support a new protocol, new software may need to be added to the device or the existing software may need to be updated. Installing or updating software may be a resource intensive and time consuming process.

SUMMARY

Techniques are provided for an architecture, of a device, that supports multiple protocols. The architecture may be used to add support, to the device, for a new protocol that the device did not previously support. The new protocol may be any type of protocol, including but not limited to a Web Services protocol.

In an embodiment, protocol information, which identifies how to add support for the protocol to the device, is stored in a repository at or accessible to the device. After the protocol information is stored, a protocol manager reads the protocol information and performs actions necessary for the new protocol to be supported by the device.

In an embodiment, the protocol manager may create a listener, a message queue, and a protocol handler for the protocol based on the protocol information. The listener may receive a message, associated with the new protocol, that was sent to the device and store the message in a message queue also associated with the new protocol. The message queue stores the message until the message is retrieved from the message queue by a protocol handler. The protocol handler, after retrieving a message from the message queue, may process the message. The protocol information, used to create the protocol handler, may describe how the protocol handler is to process messages associated with the new protocol. For example, the protocol information may identify one or more callback functions that are to be invoked when certain messages, associated with the new protocol, are processed by the protocol handler.

Due to the modular nature of the architecture, a device may be updated to add support for a new protocol without the expenditure of costly time and resources typically involved with installing and updating software on the device.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention described herein. It will be apparent, however, that embodiments of the invention described herein may be practiced without these specific details. In other instances, well-known structures and devices are shown in block diagram form in order to avoid unnecessarily obscuring the embodiments of the invention described herein.

System Overview

Figure 1:
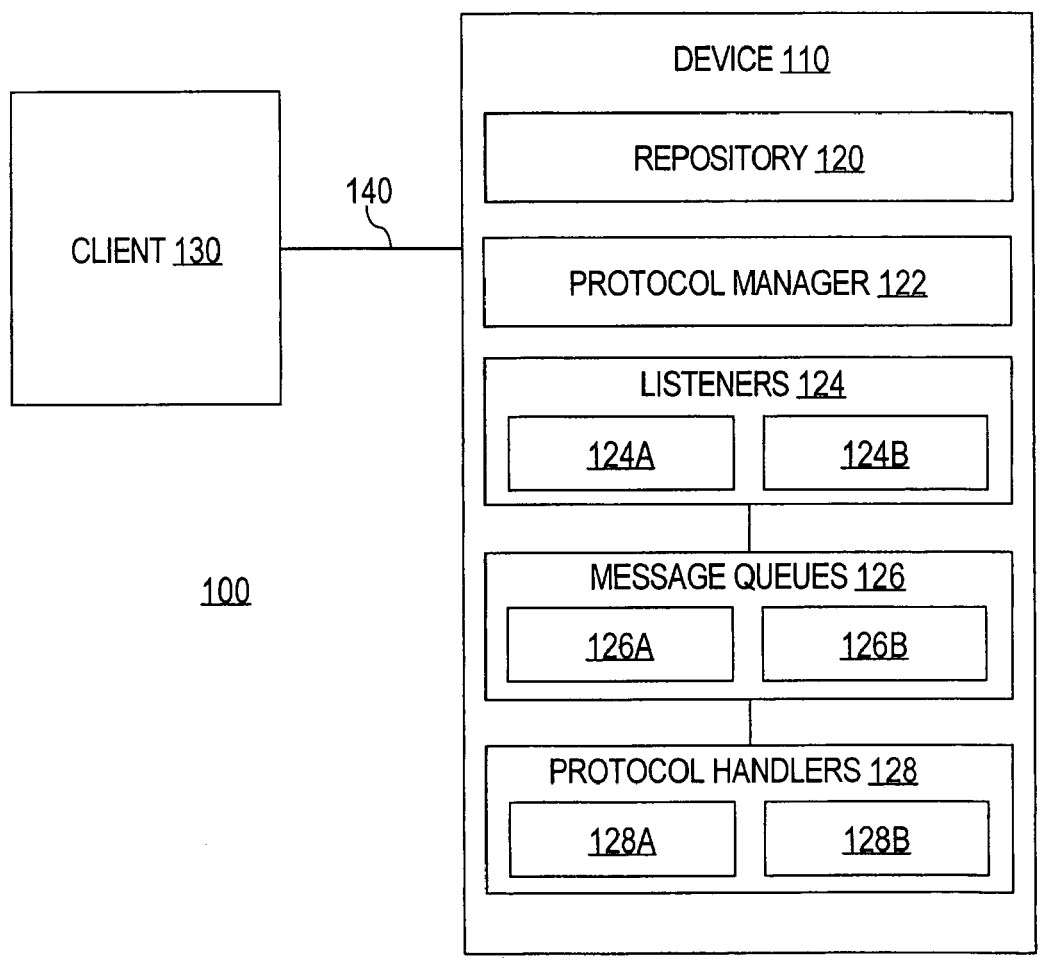
FIG. 1 is a block diagram of an illustrative system according to an embodiment of the invention.

FIG. 1 is a block diagram of an illustrative system 100 according to an embodiment of the invention. System 100 may be used to add support, to a device, for a new protocol that the device did not previously support. In an embodiment, system 100 includes device 110 and optionally, may include client 130 and communications link 140.

Device 110 represents any electronic device that may support a protocol. Device 110 may support a protocol by operating in accordance with the protocol. For example, device 110 may operate in accordance with a protocol by receiving a message that conforms to the protocol, process the message, and send a response that conforms to the protocol. Non-limiting, illustrative examples of device 110 include a multi-function peripheral (MFP), a printer, a photocopier, a scanner, a facsimile machine, a personal computer, an embedded computer, a kitchen appliance, and a vending machine.

In an embodiment, device 110 may include repository 120, protocol manager 122, listeners 124, message queues 126, and protocol handlers 128. Repository 120 may be implemented by any medium or mechanism that is capable of storing protocol information. Protocol information is information that identifies how to add support for one or more protocols to device 110. Repository 120 may or may not persistently store the protocol information. Non-limiting, illustrative examples of repository include volatile memory, non-volatile memory, a database, a record or a set of records, a file or file system, and a hard drive. While repository 120 is depicted in FIG. 1 as residing on device 110, in other embodiments of the invention, repository 120 may be implemented external to, but accessible by, device 110.

Protocol manager 122 may be implemented by any medium or mechanism that provides for reading the protocol information stored in repository 120 and performing certain actions based on the protocol information. For example, protocol manager 122 may, based on the protocol information, create a listener, a message queue, and a protocol handler for a particular protocol. Protocol manager 122 may be implemented as software executing on device 110 or as hard-wired logic comprised within device 110.

In an embodiment, each protocol supported by device 110 may have a corresponding listener, message queue, and protocol handler. As device 110 may support any number of protocols, it is possible that device 110 may have multiple listeners, multiple message queues, and multiple protocol handlers. Thus, listeners 124 shall collectively refer to all listeners created on device 110, message queues 126 shall collectively refer to all message queues created on device 110, and protocol handlers 128 shall collectively refer to all protocol handlers created on device 110. For purposes of providing a clear explanation in the description of the examples herein, individual listeners, message queues, and protocol handlers created on device 110 may be identified using a letter in addition to the numerical label, e.g., listener 124A, message queue 126A, protocol handler 128B, and so on. However, those in the art shall understand that each individual listener, message queue, and protocol handler, of a practical implementation, do not need to be identified by a specific name, as they may be linked internally by data structures and/or class instances.

Listeners 124 may be implemented by any medium or mechanism that provides for receiving messages that conform to a particular protocol at device 110. For example, a listener may listen at a particular port on device 110 for messages sent to device 110. When a listener receives a message at the particular port, the listener may cause the message to be stored on a particular message queue. While FIG. 1 depicts two listeners 124, namely listener 124A and listener 124B, system 100 may include any number of listeners.

Message queues 126 may be implemented by any medium or mechanism that provides for storing messages at device 110. A message may be placed on a message queue by a listener and may be removed from a message queue by a protocol handler. Message queues 126 may be implemented in volatile or non-volatile storage. While FIG. 1 depicts two message queues 126, namely message queue 126A and message queue 126B, system 100 may include any number of message queues.

Protocol handlers 128 may be implemented by any medium or mechanism for processing messages received at device 110. A protocol handler may remove a message from a message queue and process the message. While FIG. 1 depicts two protocol handlers 128, namely protocol handlers 128A and protocol handler 128B, system 100 may include any number of protocol handlers.

In an embodiment, system 100 may also include client 130 and communications link 140. Client 130 represents any machine that is capable of exchanging communications with device 110. A user, such as an administrator, may use client 130 to send instructions to device 110. Non-limiting, illustrative examples of client 130 includes a personal computer, an embedded computer, a cell phone, and a personal digital assistance (PDA).

Communications link 140 may be implemented by any medium or mechanism that provides for the exchange of data between client 130 and device 110. Illustrative examples of communications link 140 include, without limitation, a network such as a Local Area Network (LAN), Wide Area Network (WAN), Ethernet or the Internet, or one or more terrestrial, satellite or wireless links.

Having described an illustrative system according to an embodiment of the invention, additional description will now be provided regarding an illustrative device 110.

An Illustrative Device

Device 110 may be implemented by any device that can support one or more protocols. As a result, device 110 represents a large number of different types of devices.

Figure 2:
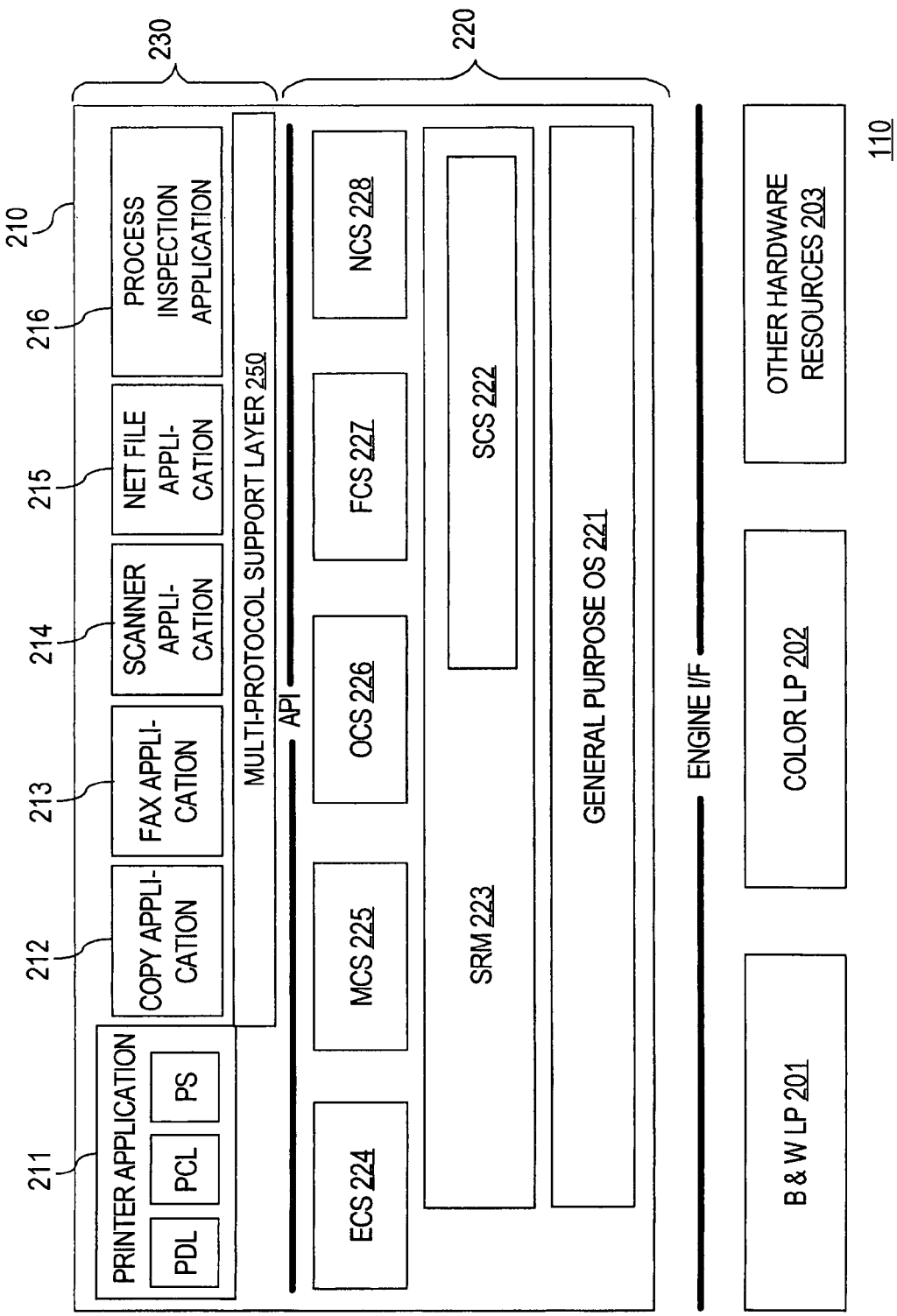
FIG. 2 is an illustrative depiction of an illustrative device according to an embodiment of the invention.

FIG. 2 is an illustrative depiction of an illustrative device 110, in further detail, according to an embodiment of the invention. In the embodiment depicted in FIG. 2, device 110 corresponds to a multi-function peripheral (MFP) that employs the architecture depicted in FIG. 2 (the "GW architecture").

As shown in FIG. 2, device 110 includes a black and white line printer (B&W LP) 201, color line printer (Color LP) 202, and other hardware resources 203. In addition, a software group 210 includes platform 220 and applications 230.

Platform 220 includes control service, system resource manager (SRM) 223, and general purpose OS 221. The control service explained below interprets a processing request issued by applications 230 and generates an acquisition request of hardware resources. System resource manager 223 manages one or more hardware resources and arbitrates between acquisition requests from the control service.

The control service includes a plurality of service modules. In the illustrative example depicted in FIG. 2, the control service includes SCS (system control service) 222, ECS (engine control service) 224, MCS (memory control service) 225, OCS (operation panel control service) 226, FCS (FAX control service) 227, and NCS (network control service) 228. Platform 220 includes an application program interface that allows other processing entities to interact with platform 220.

General purpose OS 221 is a general-purpose operating system, such as UNIX, and executes software programs of platform 220 and applications 230 in parallel respectively as processes. By using open source UNIX, the safety of the programs can be ensured and correspondence to the network becomes possible, and the source code can be obtained easily. In addition, the royalty of the OS and TCP/IP is unnecessary, and out sourcing also becomes easy.

SRM 223 conducts system control and resource management in cooperation with SCS 222. In accordance with a request from a high order layer utilizing hardware resources of an engine such as a scanner portion or a printer portion, a memory, an HDD file, and a host I/O (such as a Centro-I/F, a network I/F, an IEEE 1394 I/F, and an RS 232C I/F), SRM 323 conducts arbitration and execution control.

In the illustrative example depicted in FIG. 2, SRM 223 determines whether requested hardware resources are available (whether the requested hardware resources are not utilized by other requests). If available, SRM 223 notifies a high order layer that the requested hardware resources are available. Further, SRM 223 may conduct utilization scheduling of hardware resources in response to a request from a high order layer, and directly carry out request contents (for example, such as paper conveyance and image formation operation, memory insurance, file generation).

In an embodiment, SCS 222 conducts (1) application management, (2) operation section control, (3) system screen display (such as job list screen and counter display screen), (4) LED display, (5) resource management, and (6) interrupt application control. For example, in the performance of application management, registration of an application and processing of notifying its information to another application may be conducted. As for the application that has been registered, an engine state is notified to the application according to the system setting and request setting from an application. Further, as for applications already registered, an enquiry as to whether system state transition is possible, such as enquiry of power mode shift or an interrupt mode, is conducted.

In an embodiment, in the performance of operation section control, exclusive control of the right of using the operation section of an application is conducted. Moreover, key information from an operation section driver (OCS) is notified exclusively to an application having the right of using the operation section. This key information conducts mask control of temporarily stopping notification according to the state transition of the system such as during application switchover.

Further, in the performance of system screen display, an alarm screen corresponding to the engine state may be displayed according to a request content from an application having the right of using the operation section. Among them, there is one that turns on/off alarm display according to the application state such as a user restriction screen. Other than the engine state, there is conducted display control of a job list screen for displaying a job reservation and execution situation, a counter screen for displaying total counters, and a screen indicating that the CSS is being notified. As for the system screen displays of them, the application is not requested to release the right of using the operation section and drawing is conducted as a system screen covering the application screen.

In an embodiment, in the performance of LED display, display control of a system LED, such as an alarm LED or an application key, is conducted. As for an LED peculiar to an application, the application controls it by directly using a display driver.

In an embodiment, in the performance of resource management, there is conducted service for exclusive control of engine resources (such as a scanner and a staple) that must be excluded when an application (ECS) executes a job. In an embodiment, in the performance of interrupt application control, there are support mechanisms to allow a particular application to operate preferentially.

ECS 224 may control an engine such as the black and white line printer (B&W LP) 201, color line printer (Color LP) 202, and the other hardware resource 203. ECS 224 may conduct image reading, print operation, state notification, jam recovery, and so on.

In the illustrative example depicted in FIG. 2, a series of copy/scan/print operations are implemented by successively issuing print requests to SRM 223 in accordance with job mode specification received from applications 230. Subject jobs handled by the ECS 224 are jobs with a scanner specified as an image input device or jobs with a plotter specified as an image output device.

For example, in the case of copy operation, "SCANNER-.fwdarw.PLOTTER-" is specified. In the case of file storage, "SCANNER.fwdarw.MEMORY" is specified. In the case of facsimile transmission, "SCANNER.fwdarw.FAX_IN" is specified. In the case of stored file print or print from printer application 211, "MEMORY.fwdarw.PLOTTER" is specified. In the case of facsimile reception, "FAX_OUT.fwdarw-.PLOTTER" is specified.

Although the definition of job differs depending upon application, processing operation for one set of images handled by the user is herein defined as one job. For example, in the case of an ADF (automatic document feeder) mode of copy, operation of reading one set of manuscripts put on a manuscript stand becomes one job. In a pressure plate mode, reading operation conducted as far as the final manuscript is fixed becomes one job. In the case of copy application 212, operation of copying one bundle of manuscripts becomes one job. In the case of fax application 213, transmission operation of one document or reception operation of one document becomes one job. In the case of the printer application, print operation of one document becomes one job.

In the illustrative example depicted in FIG. 2, MCS 225 conducts memory control. MCS 225 may conduct acquisition and release of an image memory, utilization of a hard disk device (HDD), and image data compression and expansion.

As functions required to manage information needed as image data files stored in the hard disk device, there are (1) file access (generation/deletion/open/close) function (including exclusive processing), (2) management of various file attributes (management of image data of physical page units as files) such as file name/ID management (file/user)/password management/storage time management/the number of pages/data format (such as compression system)/access restriction/generating application/print condition management, (3) jointing/insertion/disconnection function by taking a file as the unit and taking a page as the unit, (4) file sort function (in the order of storage time/in the order of user ID or the like), (5) notification of all file information (for display/ retrieval), (6) recovery function (file/page discard of a damaged file), and (7) automatic file deletion function.

As functions for retaining image data in a memory such as a RAM and accessing the image data, there are (1) a function of acquiring file and page/band attribute information from the applications 230, and (2) functions of securing, releasing, reading and writing an image data area from the applications 230.

OCS 226 is a module for controlling an operation panel which serves as information transfer means between the operator and main body control. OCS 226 may conduct processing of notifying a key operation event of the operator to the main body control, processing of providing a library function for each application to construct a GUI, processing of managing the constructed GUI information application to application, and display reflection processing onto an operation panel.

In the illustrative example depicted in FIG. 2, OCS 226 has (1) a library providing function for GUI construction, (2) an operation section hardware resource management function, (3) VRAM drawing/LCD display function (hardware display, display application switchover, display language switchover, window dark color display, message/icon blink display, message joint display), (4) hard key input detection function, (5) touch panel key input detection function, (6) LED output function, (7) buzzer output function.

FCS 227 provides an API for conducting facsimile transmission and reception using a PSTN/ISDN network, registration/citation of various facsimile data managed by BKM (backup SRAM), facsimile reading, facsimile reception print, and fused transmission and reception, from each application layer of a system controller.

In the illustrative example depicted in FIG. 2, the FCS 227 has (1) a transmission function of transmitting a document requested to be transmitted by an application layer, to a facsimile receiver by using a PSTN/ISDN network, (2) reception function of transferring and printing a facsimile reception screen and various reports received from the PSTN/ISDN network, (3) telephone directory citation and registration function of conducting citation and/or registration of facsimile management items such as a telephone directory and group information stored in a fax board, (4) a fax log notification function of notifying transmission and reception result history information stored in the BKM mounted on a fax board to an application which needs it, and (5) an event notification function of notifying a changed event to an application registered in the FCS when there has been a state change of the fax board.

NCS 228 is a group of modules for providing applications needing a network I/O with service which can be utilized in common. NCS 228 may distribute data received from the network side by using each protocol among applications, and acts as an intermediary when an application transmits data to the network side. To be concrete, the NCS 228 has server demons such as ftpd, httpd, lpd, snmpd, telnetd, and smtpd, and client functions of the same protocol.

Applications 230 include a printer application 211, which is an application for printer having a page description language (PDL), a PCL and a post script (PS), a copy application 212, which is an application for copy, a fax application 213, which is an application for facsimile, a scanner application 214, which is an application for scanner, a net file application 215, which is an application for net file, and a process inspection application 216, which is an application for process inspection. Since each of the applications 211 to 216 can execute operation by utilizing processes on the platform 220, a screen display control program, which conducts screen control, key operation control, and job generation, forms its main constituent. A new application may also be mounted via a network connected by the NCS 228. Applications can be added or deleted application by application.

Multi-protocol support layer 250 may be used to add support, to device 110, for a set of protocols, including a new protocol that device 110 did not previously support. In an embodiment, multi-protocol support layer 250 may include repository 120, protocol manager 122, listeners 124, message queues 126, and protocol handlers 128. In an embodiment, multi-protocol support layer 250 may perform the steps of FIG. 3 discussed in further detail below. While FIG. 2 depicts multi-protocol support layer 250 as part of applications 230, in other embodiments, multi-protocol support layer 250 may be implemented as part of platform 220.

The GW architecture is described in additional detail in U.S. patent application Ser. No. 09/897,136, filed Jul. 3, 2001, the entire contents of which are hereby incorporated by reference for all purposes as if fully set forth herein.

Having described illustrative device 110 in additional detail, additional description will now be provided regarding how to add support for a new protocol to device 110.

Adding Support to a Device

Figure 3:
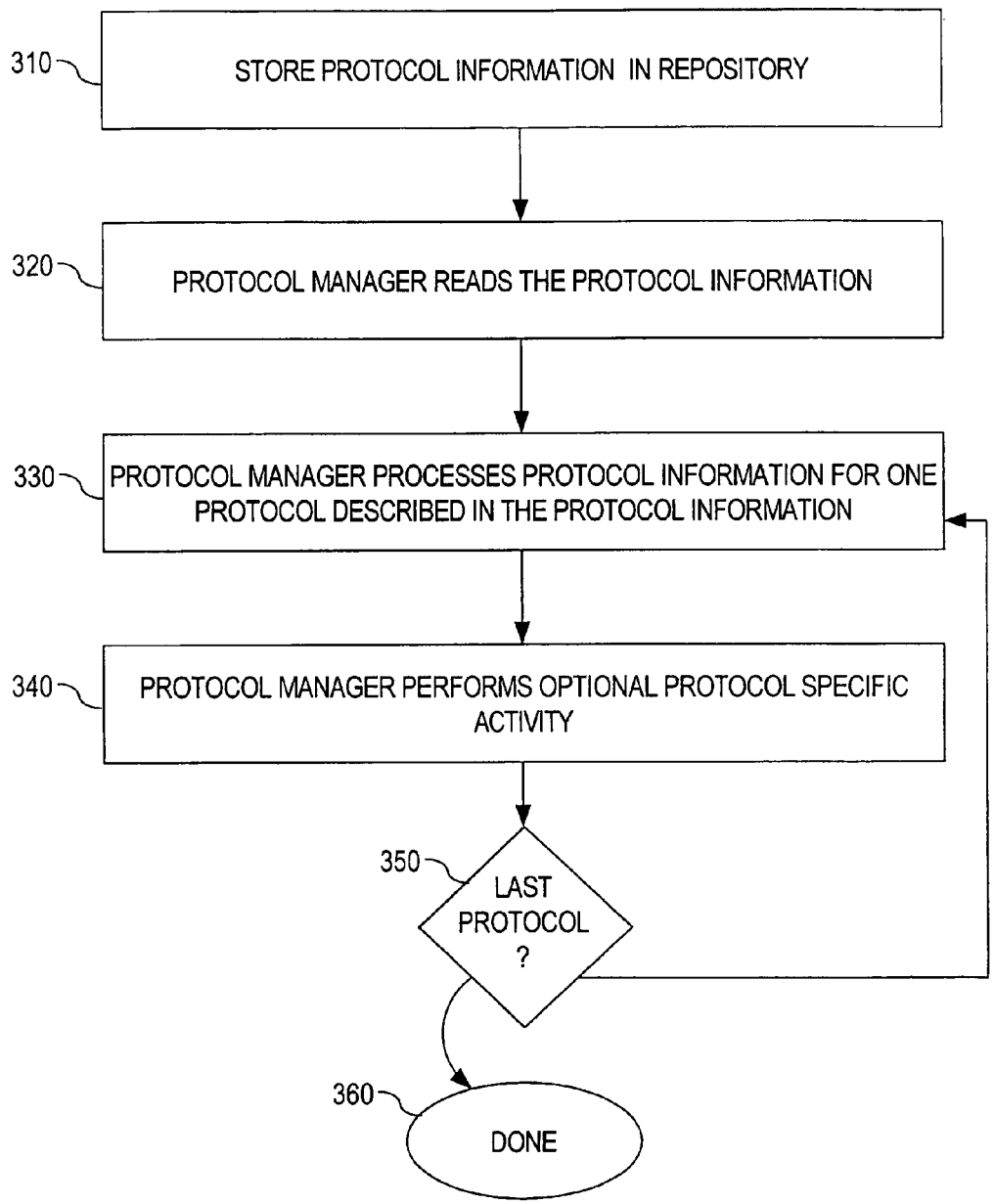
FIG. 3 is a flowchart illustrating the functional steps of adding support for a new protocol to a device according to an embodiment of the invention.

FIG. 3 is a flowchart illustrating the functional steps of adding support for a new protocol to device 110 according to an embodiment of the invention.

In step 310, protocol information is stored in repository 120. Protocol information is information that identifies how to add support for one or more protocols to device 110. For example, protocol information may instruct protocol manager 122 on how to create a listener, message queue, and protocol handler for a particular protocol. Protocol information may identify how to add support, to device 110, for any number of protocols, including a single protocol or a plurality of protocols.

In an embodiment, one or more of the protocols described by the protocol information stored in repository 120 may be a Web Services protocol. A Web Service refers to a standard, established by the W3C, defining a software system designed to support interoperable machine-to-machine interaction over a network. The specifications that define Web services are intentionally modular, and as a result, there is no one document that defines it. Web Services may encompass many different systems, such as those services that use SOAP-formatted XML envelopes and have their interfaces described by Web Services Description Language (WSDL). In other embodiments, one or more of the protocols described by the protocol information stored in repository 120 may not be a Web Services protocol.

In an embodiment, protocol information may be stored in one or more tables in repository 120. The protocol information may include, for each protocol, information used to create a listener, a message queue, and a protocol handler for the protocol, e.g., protocol information may include the information depicted in Table 1 shown below.

TABLE 1

| Unique Identifier | IP Address | Port Number | Protocol Name | Pointer to Callback Function |
| --- | --- | --- | --- | --- |
| 1 | 1.2.3.4 | 6666 | WS-discovery | 4 |
| 2 | 9.3.2.3 | 7777 | WS-transfer | 1 |

Each row of Table 1 may correspond to a different protocol that is described by the protocol information. Information stored in the column labeled unique identifier associates a unique identifier for each protocol described by the protocol information stored in Table 1. Information stored in the columns labeled IP address and port number store information about the IP address and port number a listener should be configured to listen. This information is used to by the listener. Information stored in the column protocol name stores information about the name of a particular protocol described by the protocol information. Information stored in the column labeled 'pointer to callback function' stores information that identifies how to locate a callback function associated with the protocol. This information is used to implement the protocol handler.

In an embodiment, to add support for a new protocol, information for that new protocol is added to a new row in Table 1. The columns of Table 1 shown above are merely illustrative; any information that may be used to create support in device 110 for a new protocol may be included as part of protocol information.

In an embodiment, protocol information may be stored in repository 120 by a user using an interface provided by device 110. For example, device 110 may include a graphical user interface that allows a user to submit the protocol information to device 110 so that device 110 may store the protocol information in repository 120. In another embodiment, a user may submit the protocol information to device 110 using client 130. Client 130 may send the protocol information over communications link 140. Once the protocol information is received by device 110, device 110 may store the protocol information in repository 120. After the protocol information is stored in repository 120, processing proceeds to step 320.

In step 320, protocol manager 122 reads the protocol information stored in repository 120. In an embodiment, protocol manager 122 may read the protocol information stored in repository 120 when device 110 is powered on. In such an embodiment, each time device 110 is powered on, protocol manager 122 will perform step 320 by reading the protocol information stored in repository 120. In this way, each time device 110 is powered on, protocol manager 122 will read the most recent version of the protocol information stored in repository 120.

In another embodiment, protocol manager 122 may read the protocol information stored in repository 120 upon receiving an express request to do so from client 130. In such an embodiment, an administrator may cause protocol manager 122 to read the latest version of protocol information stored in repository 120 without requiring device 110 to power cycle (i.e., power off and subsequently power on). Such an embodiment may be advantageous if the administrator wishes to cause device 110 to support a new protocol without requiring device 110 to power down and subsequently power on. After protocol manager 122 reads the protocol information stored in repository 120, processing proceeds to step 330.

In step 330, protocol manager 122 processes each protocol described in the protocol information read in step 320 one protocol at a time. In an embodiment, for the first protocol described in the protocol information read in step 320, protocol manager 122 creates a listener, message queue, and protocol handler.

To illustrate, protocol manager 122 may create a listener for the protocol that listens at the IP address and port number specified for that protocol in the protocol information. In an embodiment wherein the protocol information stored in repository 120 describes Web Services protocols, each of listeners 124 are similar to one another as Web Services protocols are designed to operate with the Simple Object Access Protocol (SOAP). As such, protocol manager 122 may be configured to create the listener for the protocol using the values provided by the protocol information.

In an embodiment, each listener listens for messages associated with a particular protocol at a particular location, e.g., listener 124A may listen for messages associated with protocol A at a first IP address and port number, and listener 124B may listen for messages associate with protocol B at a second IP address and port number. In another embodiment, a single listener may listen for messages associated with two or more protocols at two or more locations.

Protocol manager 122 may also create a message queue for the protocol, and thereafter associating the protocol name with the newly created message queue. In an embodiment, each message queue may store messages associated with a single protocol, e.g., message queue 126A may store messages associated with protocol A, and message queue 126B may store messages associated with protocol B. In another embodiment, a message queue may store messages for two or more protocols.

Protocol manager 122 may also create a protocol handler for the new protocol using information, described in the protocol information read in step 320, which identifies entities that are responsible for performing the processing of messages of that protocol; for example, protocol manager 122 may create a protocol handler for the new protocol using a pointer to a callback function identified in the protocol information. The callback function performs the protocol specific processing on messages received at device 110 associated with that protocol. In an embodiment wherein the protocol information stored in repository 120 describes Web Services protocols, each protocol handler processes messages using the Web Service protocol's Web Service Definition Language (wsdl) for the protocol, and is configured to understand how to modify, retrieve, and operate on data in device 110.

After protocol manager 122 processes protocol information for one protocol described in the protocol information, processing proceeds to step 340.

In step 340, protocol manager 122 may perform certain protocol specific activity. For example, after a listener, message queue, and protocol handler have been created for a protocol, certain variables may need to be initialized or other processing may need to be performed prior to device 110 supporting the protocol. In such a case, this activity may be performed in step 340. The performance of step 340 is optional, i.e., not all embodiments may perform step 340. After protocol manager 122 performs any optional protocol specific activity, processing proceeds to step 350. If a protocol does not require the performance of any protocol specific activity in step 340 for device 110 to support the protocol, then processing proceeds to step 350 without the performance of any actions in step 340.

In step 350, protocol manager 122 determines if protocol information for another protocol needs to be processed. If so, processing returns to step 330 as shown in FIG. 3. If not, then processing concludes in step 360. In this way, protocol manager 122 will process protocol information for each protocol described in the protocol information stored in repository 120, one protocol at a time.

Figure 4:
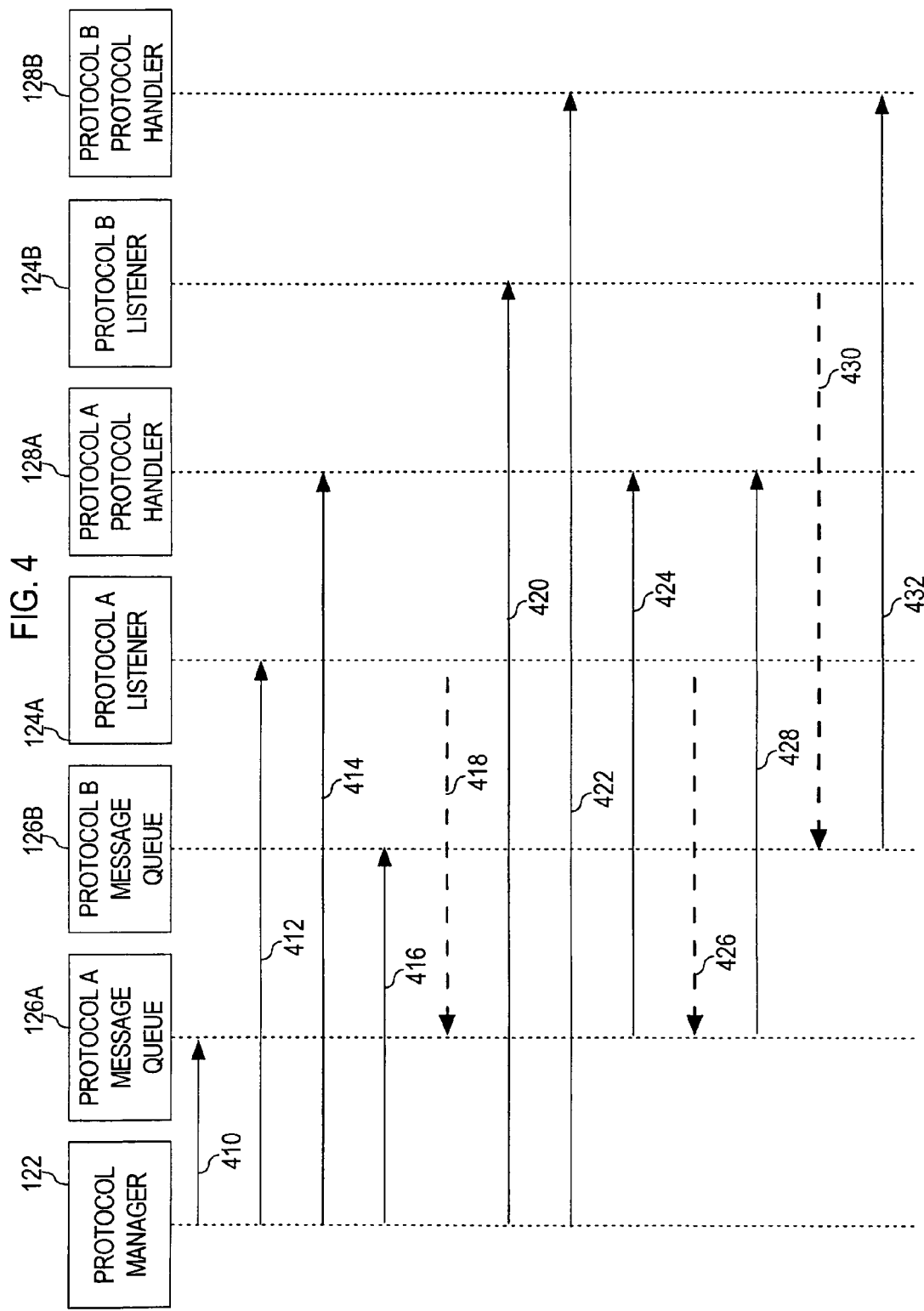
FIG. 4 is a sequence diagram illustrating adding support for two illustrative protocols to a device according to an embodiment of the invention.

FIG. 4 is a sequence diagram illustrating adding support for two illustrative protocols to device 110 according to an embodiment of the invention. The sequence diagram of FIG. 4 illustrates activity involved in creating support for protocol A and protocol B in device 110.

Initially, protocol manager 122 creates structures to support protocol A in device 110. As shown in FIG. 4, in step 410, protocol manager 122 creates message queue 126A for protocol A. Protocol manager 122 then creates, in step 412, protocol listener 124A for protocol A. Thereafter, protocol manager 122 creates protocol handler 128A for protocol A in step 414.

Thereafter, protocol manager 122 may creates structures to support protocol B in device 110. As shown in FIG. 4, in step 416, protocol manager 122 creates message queue 126B for protocol B. However, prior to creating all the structures to support protocol B, device 110 may receive a message associated with protocol A. In step 418, listener 124A, previously created for protocol A, receives a first message associated with protocol A. In response, listener 124A stores the received message on message queue 126A as shown in FIG. 4. Thereafter, protocol manager 122 may continue to create structures to support protocol B on device 110. In step 420, protocol manager 122 creates protocol listener 124B for protocol B. Thereafter, protocol manager 122 creates protocol handler 128B for protocol B in step 422.

In step 424, protocol handler 128A removes the first message from message queue 126A and processes the first message. In step 426, listener 124A receives a second message associated with protocol A, and stores the second message on message queue 126A. In step 428, protocol handler 128A removes the second message from message queue 126A and processes the second message.

In step 430, listener 124B receives a message associated with protocol B, and stores the message on message queue 126B. In step 432, protocol handler 128B removes the message associated with protocol B from message queue 126B and processes the second message.

Advantageously, embodiments of the invention allow the aspects which enable device 110 to support different protocols to be modularized, so that device 110 may be caused to support a new protocol in a fast and efficient manner and without substantial reworking of the architecture of device 110.

Implementing Mechanisms

Figure 5:
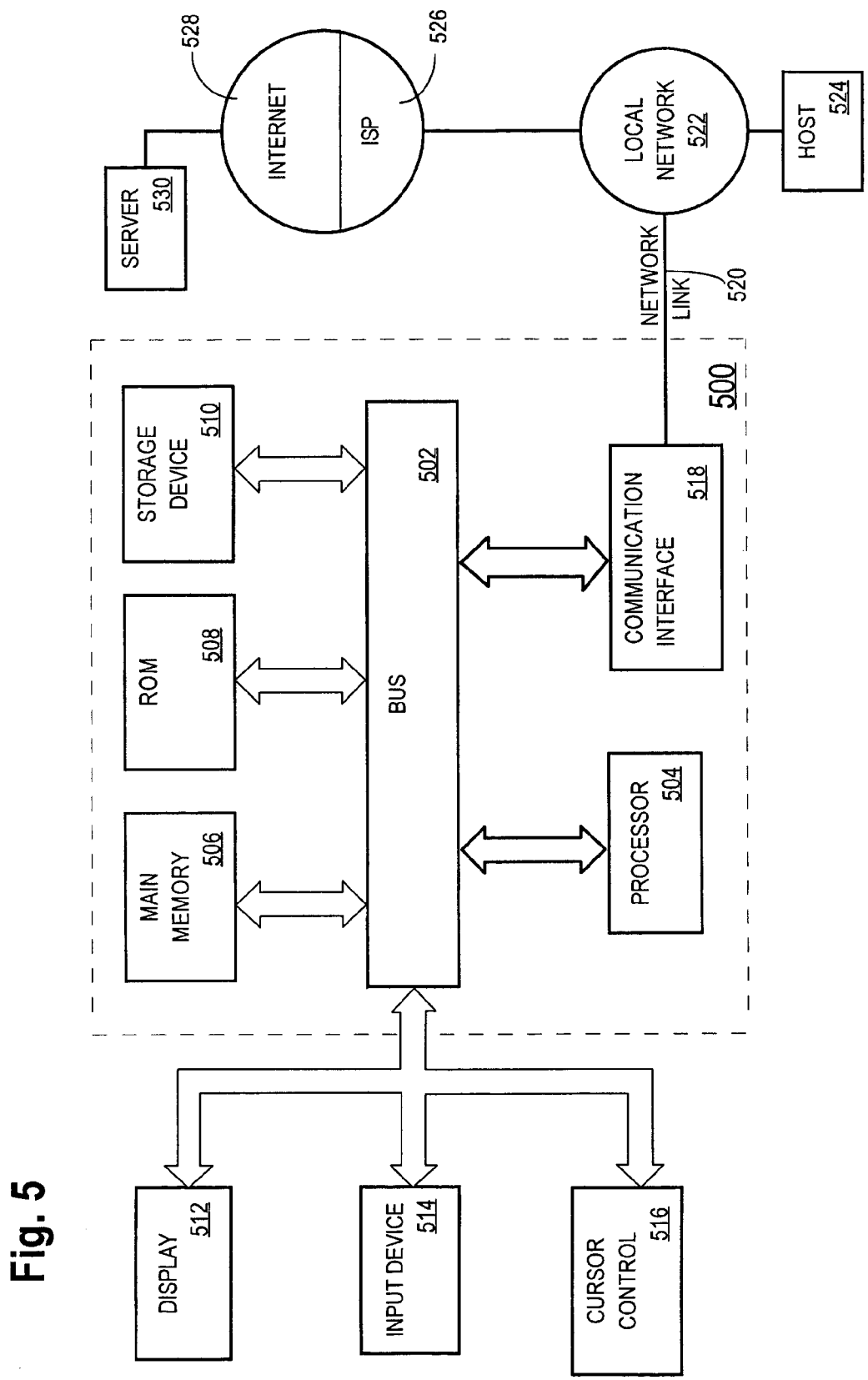
FIG. 5 is a block diagram that illustrates a computer system upon which an embodiment of the invention may be implemented.

In an embodiment, device 110 or client 130 may be implemented on or using a computer system. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, and volatile media. Non-volatile media includes, for example, optical or magnetic disks, such as storage device 510. Volatile media includes dynamic memory, such as main memory 506. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adding support for a protocol at a printing device, wherein the protocol is not currently supported by the printing device, comprising:
    storing, at the printing device, protocol information for the protocol, wherein the protocol information identifies how to add support for the protocol to the printing device; and
    after storing the protocol information at the printing device, in response to a condition being satisfied, performing:
        creating, at the printing device, based on the protocol information stored at the printing device, a listener for the protocol, wherein the listener monitors a port that is specified by the protocol information and receives, by way of a network at the monitored port of the printing device, messages associated with the protocol;
        creating, at the printing device, based on the protocol information stored at the printing device, a message queue for the protocol, wherein the message queue stores the messages associated with the protocol received at the monitored port by the printing device for the protocol; and
        creating, at the printing device, based on the protocol information stored at the printing device, a protocol handler for the protocol, wherein the protocol handler performs protocol specific processing on the messages received at the monitored port and associated with the protocol by calling a function specified by the protocol information;
    wherein the printing device is one of: a multi-function peripheral, a facsimile machine, a printer, and a copier.

2. The method of claim 1, wherein the condition is the printing device being powered on.

3. The method of claim 1, wherein the condition is receiving, at the printing device, an express request to create the message queue, the listener, and the protocol handler.

4. The method of claim 1, wherein the protocol information specifies one or more callback functions used in creating the protocol handler.

5. The method of claim 1, wherein the protocol is a web service protocol designed to support interoperable machine-to-machine interaction over a network.

6. The method of claim 1, wherein the protocol information is stored external to the printing device.

7. A machine-readable medium carrying one or more sequences of instructions, wherein execution of said one or more sequences of instructions by one or more processors causes:
    storing, at a printing device, protocol information for the protocol, wherein the protocol information identifies how to add support for the protocol to the printing device, wherein the protocol is not currently supported by the printing device; and
    after storing the protocol information at the printing device, in response to a condition being satisfied, performing:
        creating, at the printing device, based on the protocol information stored at the printing device, a listener for the protocol, wherein the listener monitors a port that is specified by the protocol information and receives, by way of a network at the monitored port of the printing device, messages associated with the protocol;
        creating, at the printing device, based on the protocol information stored at the printing device, a message queue for the protocol, wherein the message queue stores the messages associated with the protocol received at the monitored port by the printing device for the protocol; and
        creating, at the printing device, based on the protocol information stored at the printing device, a protocol handler for the protocol, wherein the protocol handler performs protocol specific processing on the messages received at the monitored port and associated with the protocol by calling a function specified by the protocol information;
    wherein the printing device is one of: a multi-function peripheral, a facsimile machine, a printer, and a copier.

8. The machine-readable medium of claim 7, wherein the condition is the printing device being powered on.

9. The machine-readable medium of claim 7, wherein the condition is receiving, at the printing device, an express request to create the message queue, the listener, and the protocol handler.

10. The machine-readable medium of claim 7, wherein the protocol information specifies one or more callback functions used in creating the protocol handler.

11. The machine-readable medium of claim 7, wherein the protocol is a web service protocol designed to support interoperable machine-to-machine interaction over a network.

12. The machine-readable medium of claim 7, wherein the protocol information is stored external to the printing device.

13. An apparatus for adding support for a protocol at a printing device comprising:
    one or more processors; and
    a machine-readable medium carrying one or more sequences of instructions, wherein execution of said one or more sequences of instructions by said one or more processors causes:
        storing, at the printing device, protocol information for the protocol, wherein the protocol information identifies how to add support for the protocol to the printing device, wherein the protocol is not currently supported by the printing device; and
        after storing the protocol information at the printing device, in response to a condition being satisfied, performing:
            creating, at the printing device, based on the protocol information stored at the printing device, a listener for the protocol, wherein the listener monitors a port that is specified by the protocol information and receives, by way of a network at the monitored port of the printing device, messages associated with the protocol;
            creating, at the printing device, based on the protocol information stored at the printing device, a message queue for the protocol, wherein the message queue stores the messages associated with the protocol received at the monitored port by the printing device for the protocol; and
            creating, at the printing device, based on the protocol information stored at the printing device, a protocol handler for the protocol, wherein the protocol handler performs protocol specific processing on the messages received at the monitored port and associated with the protocol by calling a function specified by the protocol information;
        wherein the printing device is one of: a multi-function peripheral, a facsimile machine, a printer, and a copier.

14. The apparatus of claim 13, wherein the condition is the printing device being powered on.

15. The apparatus of claim 13, wherein the condition is receiving, at the printing device, an express request to create the message queue, the listener, and the protocol handler.

16. The apparatus of claim 13, wherein the protocol information specifies one or more callback functions used in creating the protocol handler.

17. The apparatus of claim 13, wherein the protocol is a web service protocol designed to support interoperable machine-to-machine interaction over a network.

18. The apparatus of claim 13, wherein the protocol information is stored external to the printing device.

* * * * *